United States Patent [19]

Kushner et al.

[11] 4,287,904
[45] Sep. 8, 1981

[54] VALVE ASSEMBLY HAVING A PREDETERMINED SHEAR LINE

[75] Inventors: Gregory A. Kushner; Jack Martinic, both of South Bend, Ind.

[73] Assignee: The Bendix Corporation, Southfield, Mich.

[21] Appl. No.: 13,848

[22] Filed: Feb. 22, 1979

[51] Int. Cl.³ .............................................. F16K 13/04
[52] U.S. Cl. .................. 137/68 R; 137/797; 220/89 A
[58] Field of Search ............... 137/68 R, 70, 71, 797; 222/396; 220/89 A

[56] References Cited

U.S. PATENT DOCUMENTS 2,516,159   7/1950   Stroop .............................. 137/71 X Primary Examiner—Harold W. Weakley
Attorney, Agent, or Firm—Paul David Schoenle; Ken C. Decker

[57] ABSTRACT

A valve assembly is disposed between an accumulator and a pressure chamber in a hydraulic brake booster. The valve assembly operates to communicate the pressurized fluid to the pressure chamber when the pressurized fluid within the pressure chamber is insufficient to provide a power assist during braking. The valve assembly comprises a base which is received within a housing separating the accumulator from the pressure chamber. The base defines an opening leading to the housing bore and a body extends into the opening to define a clearance between the base and the body. The clearance leads to a recess on one end of the body which cooperates with a recess on the other end of the body to define a shear line for the body. The body is cut out on the one end of the body adjacent the recess to define a secondary passage and a portion of the body is movable after shearing into engagement with the base to substantially take up the clearance. The cutout cooperates with the base to define a restriction for the secondary passage which communicates the accumulator with the pressure chamber.

2 Claims, 3 Drawing Figures

4,287,904

VALVE ASSEMBLY HAVING A PREDETERMINED SHEAR LINE

BACKGROUND OF THE INVENTION

In a hydraulic brake booster, a valve assembly is provided for controlling the communication of pressurized fluid between an accumulator and a pressure chamber. than in the pressure chamber and Pressurized fluid is communicated from the accumulator to the pressure chamber in response to an actuator which is engageable with the valve assembly when the level of fluid pressure in the pressure chamber is inadequate to provide a power assist during braking.

If the level of pressurized fluid within the accumulator should reach an excessive level, due to heat and improper venting, the accumulator is deformable to vent a storage chamber to an engine compartment wherein a fire hazard may be created when the pressurized fluid coming in contact with a hot exhaust system.

SUMMARY OF THE INVENTION

The present invention provides a valve assembly which is adapted to prevent a sudden inadvertent brake application and a fire hazard should an accumulator in a power braking system reach an excessive fluid pressure level. In particular, the valve assembly is provided with a predetermined shear line such that a portion of the valve assembly is separated from the remaining assembly to move to a position providing a secondary passage communicating the accumulator with the pressure chamber. The secondary passage defines a restriction to gradually vent the excessive pressure in the accumulator to the pressure chamber.

The valve assembly includes a body with oppositely facing annular recesses. The recesses cooperate to define a predetermined shear line extending between the recesses. In addition, the body is cut out adjacent one of the recesses to form a secondary passage communicating the accumulator with the pressure chamber in the event the body is sheared. A base supports the body and forms a clearance with the portion of the body. When the body is sheared, the cutout is disposed adjacent the base to form a restriction in the secondary passage as the latter communicates with the pressure chamber via the clearance between the body portion and the base.

It is an object of the present invention to provide a valve assembly which is shearable at a predetermined location, as a result of excessive pressure buildup in an accumulator, to gradually vent the excessive pressure to the pressure chamber so as to avoid a sudden full brake application.

DETAILED DESCRIPTION

Figure 1:
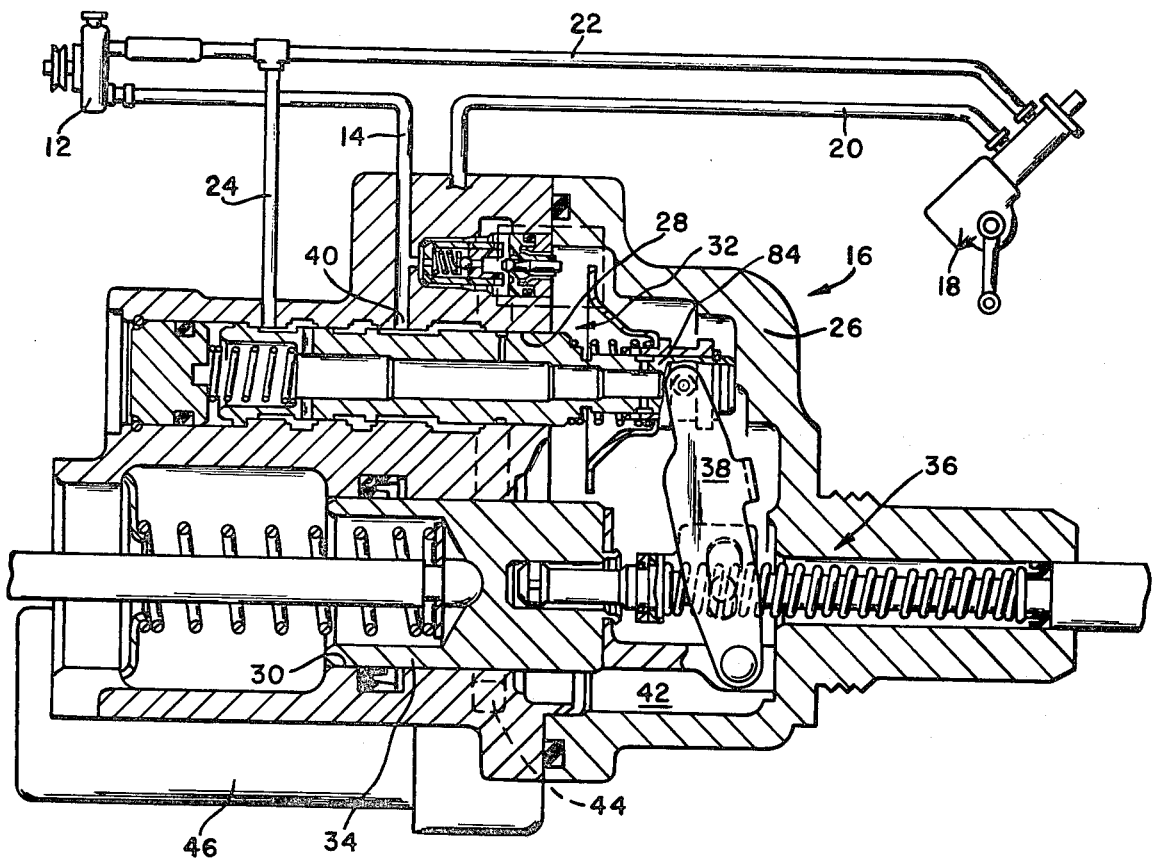
FIG. 1 is a schematic illustration of a power brake system showing a hydraulic brake booster in cross section.

The power brake system of FIG. 1 includes a fluid pump 12, such as a power steering pump, communicating fluid pressure via conduit 14 to a hydraulic brake booster 16. A power steering gear 18 receives fluid pressure from the booster 16 via a conduit 20 and returns the fluid pressure to the pump 12 via conduit 22. Fluid pressure is also returned from the booster 16 via conduit 24.

The hydraulic brake booster 16 includes a housing 26 defining a first bore 28 and a second bore 30. A control valve 32 is movably disposed within the first bore 28 while a piston 34 is movably disposed within the second bore 30. An input assembly 36 cooperates with a lever 38 to control movement of the control valve 32 to an operable position wherein pressurized fluid is communicated from an inlet 40 to a pressure chamber 42 defined by the housing 26. The piston is movable in response to fluid pressure in the pressure chamber to provide a power assist to a master cylinder (not shown) which is normally coupled to the left side of booster 16.

Figure 2:
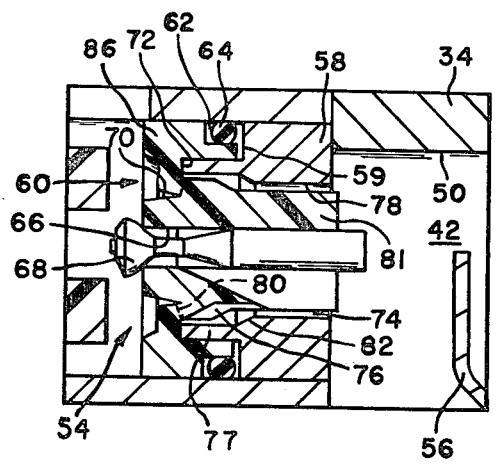
FIG. 2 is an enlarged view of the encircled portion of FIG. 1.

The housing 26 defines a passage 44 communicating with a storage chamber or accumulator 46 and a stepped bore 50, as shown more clearly in FIG. 2, communicates the accumulator 46 with the pressure chamber 42. A valve assembly 54 is disposed within the stepped bore 50 for controlling communication to the pressure chamber in response to the movement of a finger or trigger 56. The valve assembly comprises a base 58 having an annular recess 59 for receiving a body 60. The body and base cooperate to form a groove 62 which receives a seal 64. The body includes an opening 66 in which a valve member 68 is movably disposed. The valve member 68 is pressure responsive to open the storage chamber 46 to the pressure chamber 42 when the pressure in the pressure chamber is greater than the pressure in the storage chamber. Also, the valve member is engageable with the finger 56 so as to move to a position opening the storage chamber to the pressure chamber in response to movement of the finger.

In accordance with the invention the body 60 defines an annular recess at 70 on the side of the body exposed to the storage chamber. The body 60 also includes a second annular recess 72 on the side of the body exposed to the pressure chamber. A clearance 74 between the base 58 and the body 60 leads to the second recess 72 and the body 60 is cut out at 76 for a purpose which will be hereinafter described. The base 58 defines an inner diameter 78 forming a portion of the clearance 74. Also, the base includes an annular end 77 opposing the body recess 72 prior to shearing the body 60.

The recesses at 70 and 72 cooperate to define a shear line 80 extending between the recesses and the diameter of the shear line at recess 72 is greater than the diameter of the base at 78. A tapered seat 82 on the base 58 adjoins the inner diameter 78 and opposes the cut out 76 on the body.

MODE OF OPERATION

The hydraulic brake booster 16 operates in a conventional manner to provide a power assist. For example, when the input assembly 36 is actuated by a vehicle operator, the lever 38 moves the control valve 32 to a position opening the inlet 40 to the pressure chamber 42. Fluid pressure in the pressure chamber acts against the piston 34 to move the latter to the left viewing FIG. 1, so as to actuate a master cylinder whereby braking fluid is communicated to a brake assembly.

In order to charge the storage chamber with fluid pressure, the valve member 68 is movable to an open position when the pressure in chamber 42 is greater than in chamber 46 to communicate fluid pressure from the chamber 42 to the chamber 46. If the fluid pressure within the pressure chamber 42 is insufficient to move the piston 34, the input assembly 36 is moved further so that the finger 56 on the lever 38 is brought into engagement with the valve member 68. As a result, the valve member 68 is moved by the finger 56 to an open position to communicate pressurized fluid from the storage chamber 46 to the pressure chamber 42. Consequently, a power assist is provided for the piston 34 and master cylinder even through the control valve 32 or pump 12 fails to supply enough pressurized fluid to the pressure chamber during a braking application.

When the storage chamber is pressurized to its maximum value and the hydraulic brake booster is subjected to an environment wherein the temperature is increasing, it is possible for the fluid pressure in the storage chamber to increase to a level where rupture of the accumulator 46 may occur. If the rupture occurs away from the pressure chamber 42, the fluid in the storage chamber will vent to the environment which is not desirable because of the fire hazard when the fluid contacts a hot exhaust manifold. If the rupture occurs at a location near the pressure chamber, the storage chamber fluid will vent to the pressure chamber to create an unexpected sudden full power braking application. In order to alleviate both of these situations, the body 60 of the valve assembly 54 provides a defined shear line which enables the body to fracture at a predetermined pressure level below that which ruptures the accumulator 46 but sufficiently above that pressure level required for providing a power assist to the booster.

Figure 3:
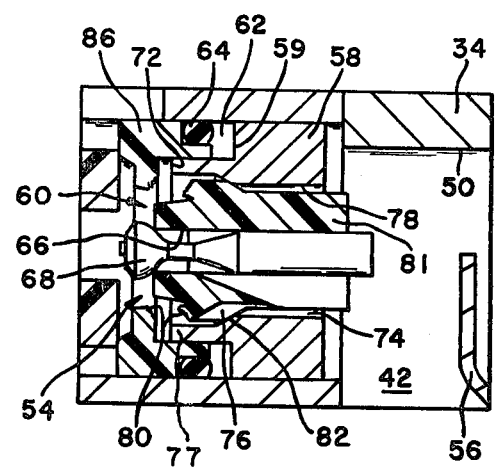
FIG. 3 is a view similar to FIG. 2 showing the valve assembly in a sheared condition.

If the predetermined pressure level in the storage chamber is reached, the body fractures such that an the inner portion 81 of the body 60 is forced into engagement with the seat 82 of the base 58. The inner portion 80 includes the cutout 76 so that the cutout 76 is moved to a position adjacent the tapered seat 82 as shown in FIG. 3. In this position the cutout 76 cooperates with the seat to form a restricted passage communicating the storage chamber with the pressure chamber. Although fluid pressure in the storage chamber 46 is vented to the pressure chamber 42, the restriction between the seat 82 and cutout 76 prevents a rapid buildup of pressure in the pressure chamber so that fluid pressure is gradually vented to the pressure chamber without causing a sudden full power assist for actuating braking. From the pressure chamber the gradually vented fluid pressure is communicated to return conduit 24 via passage 84 on control valve 32.

An outer portion 86 of the body 60 remains in engagement with the base 58 at the recess 59 so that the inner portion 80 separates axially from the outer portion 86 to abut the base 58. When comparing FIG. 2 and FIG. 3, it is seen that the portion 86 is free to move away from the base 58 in response to fluid pressure within groove 62.

From the foregoing description it is seen that the present invention provides a defined shear line for a valve assembly to control venting of the storage chamber through a restricted passage should the valve assembly fracture in response to an excessive buildup of fluid pressure in the storage chamber.

We claim:

1. In a valve assembly having a body which is received within a bore 50 of a housing, the bore leading to a pressure chamber within the housing, the body having a passage providing communication through the bore, and a valve member carried by the body within the passage, the valve member cooperating with the body in a first position to close the passage and being movable to a second position to open the passage to communicate fluid pressure through the passage to the pressure chamber, characterized by the body including means to provide for shearing of the body at a predetermined location, a portion of the body being movable when the body is sheared to engage the housing and said portion cooperating with the housing to substantially define a secondary passage opening to the pressure chamber when the body is sheared, and the engagement between said portion and the housing substantially defining a restriction within said secondary passage to provide for restricted communication of fluid pressure to the pressure chamber.

2. In a valve assembly for controlling fluid communication through a housing bore, a base engaging the housing and defining an opening in common with the housing bore, a body engaging the housing and extending into the base opening to define a clearance with the base, the body having a passage opening to the bore and having a valve member movably disposed in the passage to control communication through the housing bore in response to movement of the valve member, the clearance between the base and body substantially defining a recess on the body, the recess substantially defining a shear line to provide for shearing the body into portions, one of said portions being movable relative to the base when the body is sheared, said one portion cooperating with the base subsequent to shearing to define a secondary passage within the clearance for restricted communication through the housing bore, and the base including a portion extending into said recess to abut the body substantially adjacent the shear line.

* * * * *